(12) United States Patent
Packer

(10) Patent No.: US 9,161,524 B2
(45) Date of Patent: Oct. 20, 2015

(54) FISHING PLIERS WITH FISHING LINE RAMP

(71) Applicant: Edson Barton Packer, Herber, UT (US)

(72) Inventor: Edson Barton Packer, Herber, UT (US)

(*) Notice: Subject to any disclaimer, the term of this patent is extended or adjusted under 35 U.S.C. 154(b) by 391 days.

(21) Appl. No.: 13/787,261

(22) Filed: Mar. 6, 2013

(65) Prior Publication Data

US 2014/0000418 A1     Jan. 2, 2014

Related U.S. Application Data

(60) Provisional application No. 61/665,035, filed on Jun. 27, 2012.

(51) Int. Cl.
| | |
|---|---|
| *B25B 7/02* | (2006.01) |
| *B25B 7/22* | (2006.01) |
| *A01K 69/00* | (2006.01) |
| *B25F 1/00* | (2006.01) |
| *A01K 97/28* | (2006.01) |
| *A01K 91/04* | (2006.01) |
| *A01K 97/26* | (2006.01) |

(52) U.S. Cl.
CPC ................. *A01K 97/28* (2013.01); *A01K 91/04* (2013.01); *A01K 97/26* (2013.01); *B25B 7/22* (2013.01)

(58) Field of Classification Search
CPC .................................. A01K 91/04; B25B 7/22
USPC ................. 7/106, 127; 81/418; D22/149, 150
See application file for complete search history.

(56) References Cited

U.S. PATENT DOCUMENTS

| | | | |
|---|---|---|---|
| 3,402,957 A | | 9/1968 | Peterson |
| 3,873,140 A | * | 3/1975 | Bloch ............................ 289/17 |
| 4,029,346 A | | 6/1977 | Browning |
| 4,315,445 A | | 2/1982 | Catron |
| 4,697,370 A | * | 10/1987 | Vissing ........................... 289/17 |
| 5,383,695 A | * | 1/1995 | Couper ........................... 289/17 |
| 5,839,141 A | | 11/1998 | Hermann |
| 6,041,541 A | | 3/2000 | Davis |
| 6,061,858 A | | 5/2000 | Shepard |
| 6,272,709 B1 | | 8/2001 | Strini |
| 6,892,911 B2 | | 5/2005 | Hamazaki |
| 7,114,279 B2 | | 10/2006 | Brauner et al. |
| 7,716,768 B2 | | 5/2010 | Higgins |
| 7,793,459 B1 | | 9/2010 | Ruzicka |

(Continued)

OTHER PUBLICATIONS

Pages from http://hookthreader.com, dated Jul. 16, 2012 (12 pages).
Pages from hookthreader.com printed Jul. 18, 2012 (2 pages).

(Continued)

*Primary Examiner* — Bryan R Muller
(74) *Attorney, Agent, or Firm* — Workman Nydegger

(57) ABSTRACT

Fishing pliers that enable the user to conveniently extend fishing line into the eyelet of a fishing lure, the fishing pliers comprising: (i) a first elongate member, and (ii) a second elongate member pivotally coupled to the first elongate member, each elongate member having a proximal handle portion and a distal tip end portion and an intermediate section therebetween, wherein the first elongate member has, in the intermediate portion thereof, a channel configured to receive fishing line and a slot configured to receive an eyelet of a fishing lure such that when fishing line is passed through and the channel, the fishing line is oriented so as to be configured to conveniently enter the eyelet of the fishing lure, thereby enabling the user to conveniently extend fishing line into the eyelet of a fishing lure.

20 Claims, 17 Drawing Sheets

(56) References Cited

U.S. PATENT DOCUMENTS

2007/0193104 A1* 8/2007 Molyneux .......................... 43/4
2012/0005939 A1* 1/2012 Vandewalle ....................... 43/4

OTHER PUBLICATIONS

Pages from http://hookthreader.com, dated Jul. 11, 2012 (4 pages).
Pictures from video posted on Youtube.com on Jun. 13, 2009 featuring hookthreader, (6 pages), printed Jul. 18, 2012.
Pictures from video posted on Youtube.com on Mar. 23, 2010 featuring fish hook threader, (6 pages), printed Jul. 18, 2012.
Pages from http://stonecreekltd.com printed Jul. 16, 2012 (31 pages).
Pages from http://www.stoneriveroutfitters.com/browse.cfm/quik-tye-tool/4,945.html , Quik-Tye Tool, dated Jul. 18, 2012 (2 pages).
Pages from www.beaucatcher.com, printed Jun. 13, 2012 (3 pages).
20/20 Magnetic Tippet Threader, packaging and device, publically available and on sale, on information and belief, at least as early as May 2012, (13 photographs).
Page from www.stonecreekltd.com, Quik-Tye, printed Jul. 11, 2012 (1 page).
International Search Report and the Written Opinion of the International Searching Authority dated Dec. 12, 2013 for International Application No. PCT/US2013/051079 (7 pages).

* cited by examiner

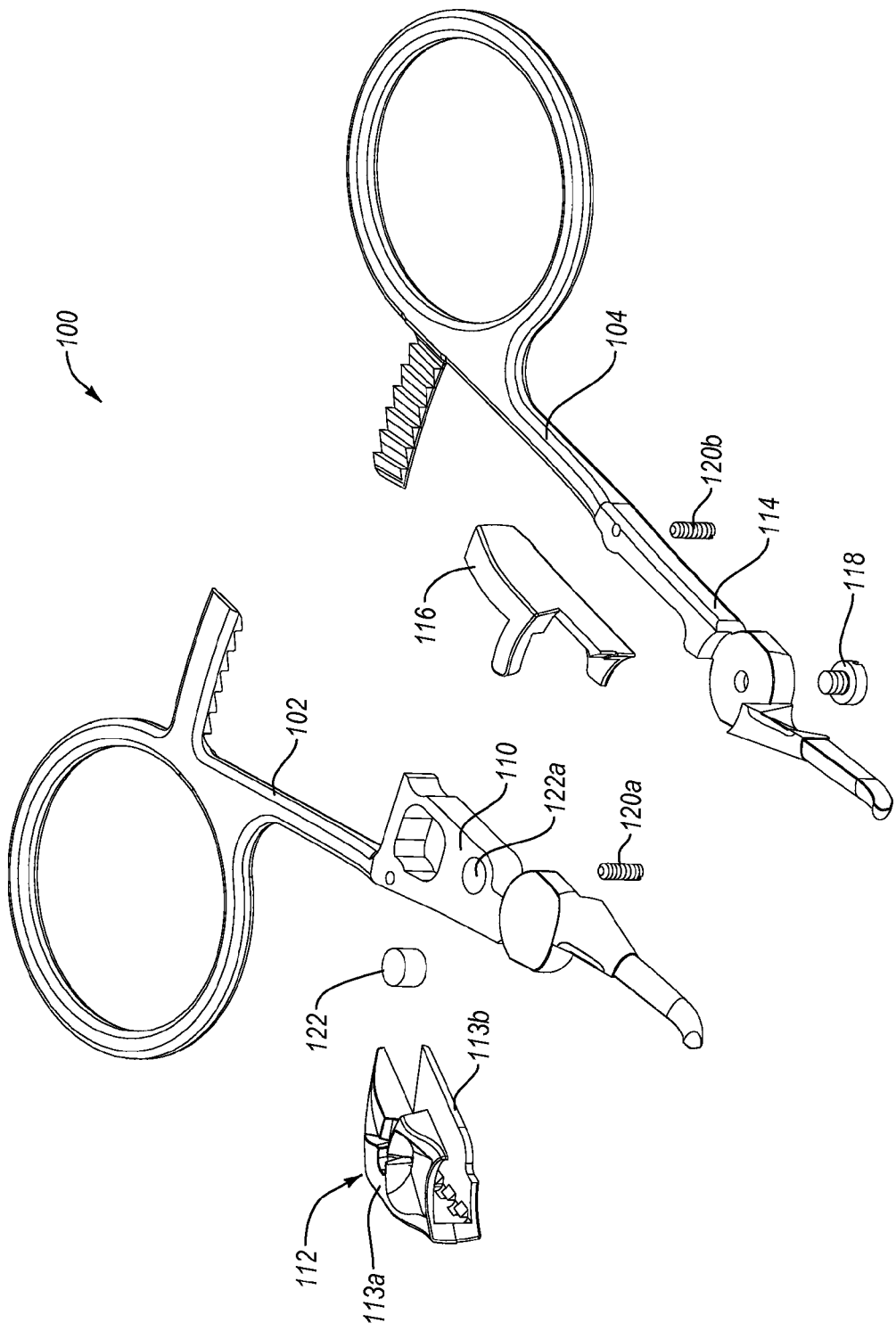

FISHING PLIERS WITH FISHING LINE RAMP

CROSS-REFERENCE TO RELATED APPLICATIONS

This application is a Non-Provisional application of U.S. patent application Ser. No. 61/665,035, filed Jun. 27, 2012, entitled FISHING PLIERS WITH FISHING LINE RAMP, which is incorporated herein in its entirety by this reference.

BACKGROUND OF THE INVENTION

1. The Field of the Invention

This invention is in the field of fishing pliers.

2. The Relevant Technology

Tying fishing line onto a lure, such as a fly, spinner, or bait hook, is often a difficult process, particularly for people with limited fishing experience or eyesight or physical limitations that make tying a small piece of line onto the small eyelet of a lure difficult. The small sizes of line and lure that are desirable for successful fishing often make it difficult to tie the line onto the lure. It is therefore desirable to streamline the tying process by producing products that make the process more efficient and less cumbersome.

BRIEF SUMMARY OF THE INVENTION

A general object of the present invention is to provide an apparatus and methodology to rapidly thread and tie a fishing fly/hook onto a fishing line and cut excess line in a single continuous process without need to remove gloves or set down the apparatus.

Another object of the present invention is for the apparatus to have a similar function and appearance of hemostat pliers.

Another object of the present invention is to provide the apparatus with gripping jaws having progressively finer gripping surfaces so that the pliers can be used with both large and small objects and facilitate the removal of hooks.

Another object of the present invention is to provide the apparatus with locking jaws to hold miscellaneous fishing and non-fishing related items.

Another object of the present invention is to provide the apparatus with a fishing fly/hook positioner and mechanism to facilitate the easy and rapid threading of the fishing line through the eye of the hook.

Another object of the present invention is to provide the apparatus with a device to hold in place both the hook and line following threading to allow the apparatus to be held in a variety of positions without the thread sliding out of the hook or the hook falling from the apparatus.

Another object of the present invention to provide the apparatus with uniquely designed jaws to facilitate the tying of a variety of knots.

Another object of the present invention is to provide the apparatus with cutters that can be used for many common fishing tasks as well as other tasks.

Another object of the present invention is to provide the apparatus with a magnetic surface to hold fishing flies and hooks.

Another object of the present invention is to provide the apparatus with a needle to clean debris from the eye of the fishing hook.

An additional object of the present invention is to provide the apparatus suitable for use in a harsh environment.

A further object of the invention is to provide the apparatus with a smooth accurate pivot action.

As used herein, the term "lure" is used to refer to any object that includes a hook that is designed to be used in angling to catch fish. Examples of lures, as defined in this application, thus include fishing flies, spinners, worm hooks, and a variety of other lures having hooks thereon. Each lure has a hook and an eyelet connected to the hook which is metallic, and is therefore subject to being magnetically coupled to an object through the use of a magnetic force.

The present invention includes a magnet that selectively couples an eyelet to the pliers when the eyelet is placed in close proximity to the portion of the pliers that includes the magnet. The lure can be removed from the magnetized force of the pliers by providing sufficient force to move the lure away from the magnetized lure.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only illustrated embodiments of the invention and are therefore not to be considered limiting of its scope. The invention will be described and explained with additional specificity and detail through the use of the accompanying drawings in which:

FIG. 6 illustrates placing the pliers of FIG. 1 within the loop 70 of the line.

FIG. 7 illustrates the use of the pliers of FIG. 1 to twist the line in order to begin tying a standard fishing knot.

FIG. 8 illustrates grasping a free end 72 of the twisted line with a distal tips of the pliers of FIG. 1.

FIG. 9 illustrates pulling the free end 72 of the line through the bottom loop of the line.

FIG. 10 illustrates tightening the line to form a desired knot in the line.

FIG. 11 illustrates cutting the excess line from the knot.

FIGS. 12a-15 show another embodiment of pliers 100 of the present invention, FIGS. 12a and 12b showing respective top and bottom perspective views.

FIGS. 14a and 14b show pliers 100 in respective top and bottom exploded views.

FIG. 15 shows a close up view of pliers 100.

DETAILED DESCRIPTION OF THE PREFERRED EMBODIMENTS

Figure 1:
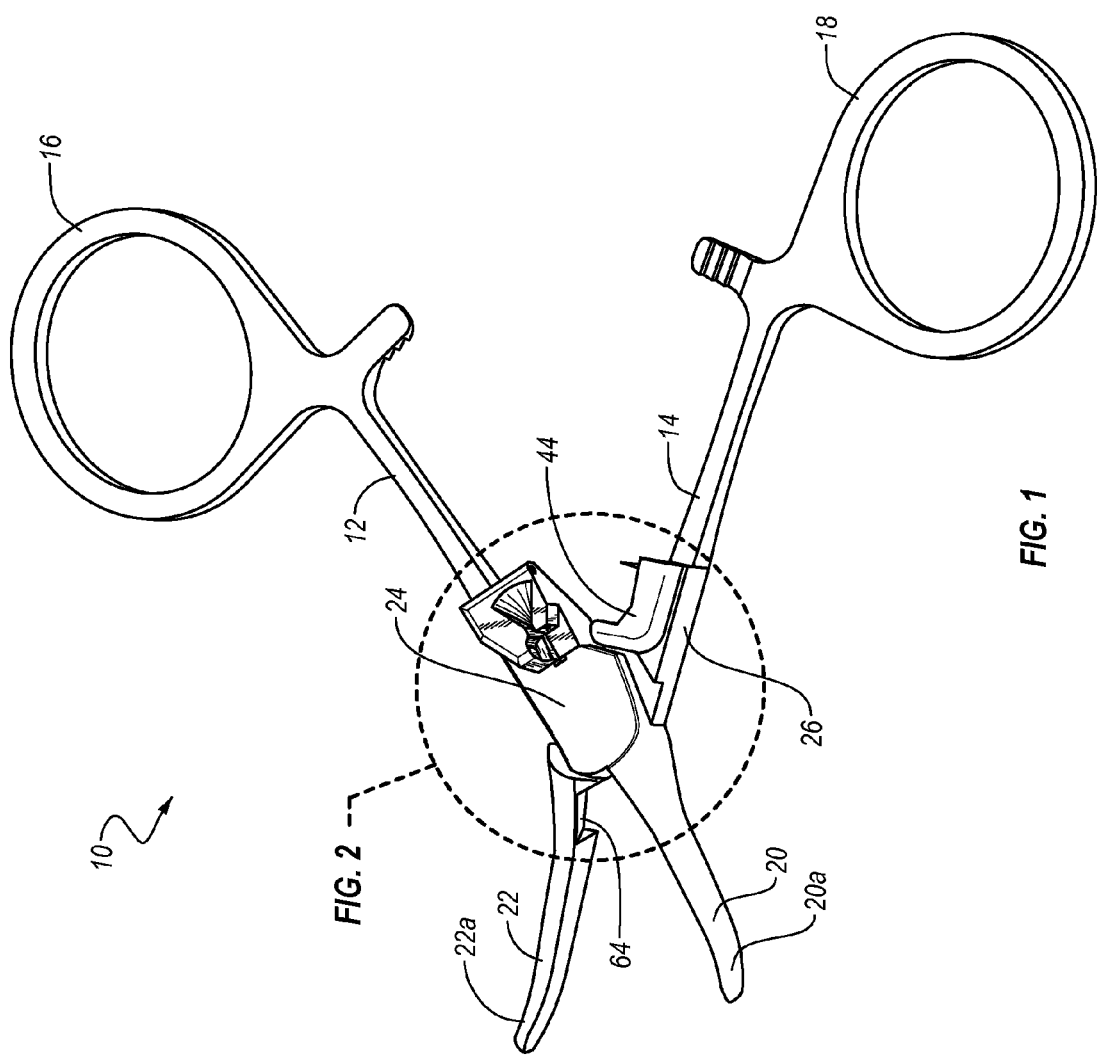
FIG. 1 illustrates a perspective top view of the pliers 10 in an open position.
Figure 2:
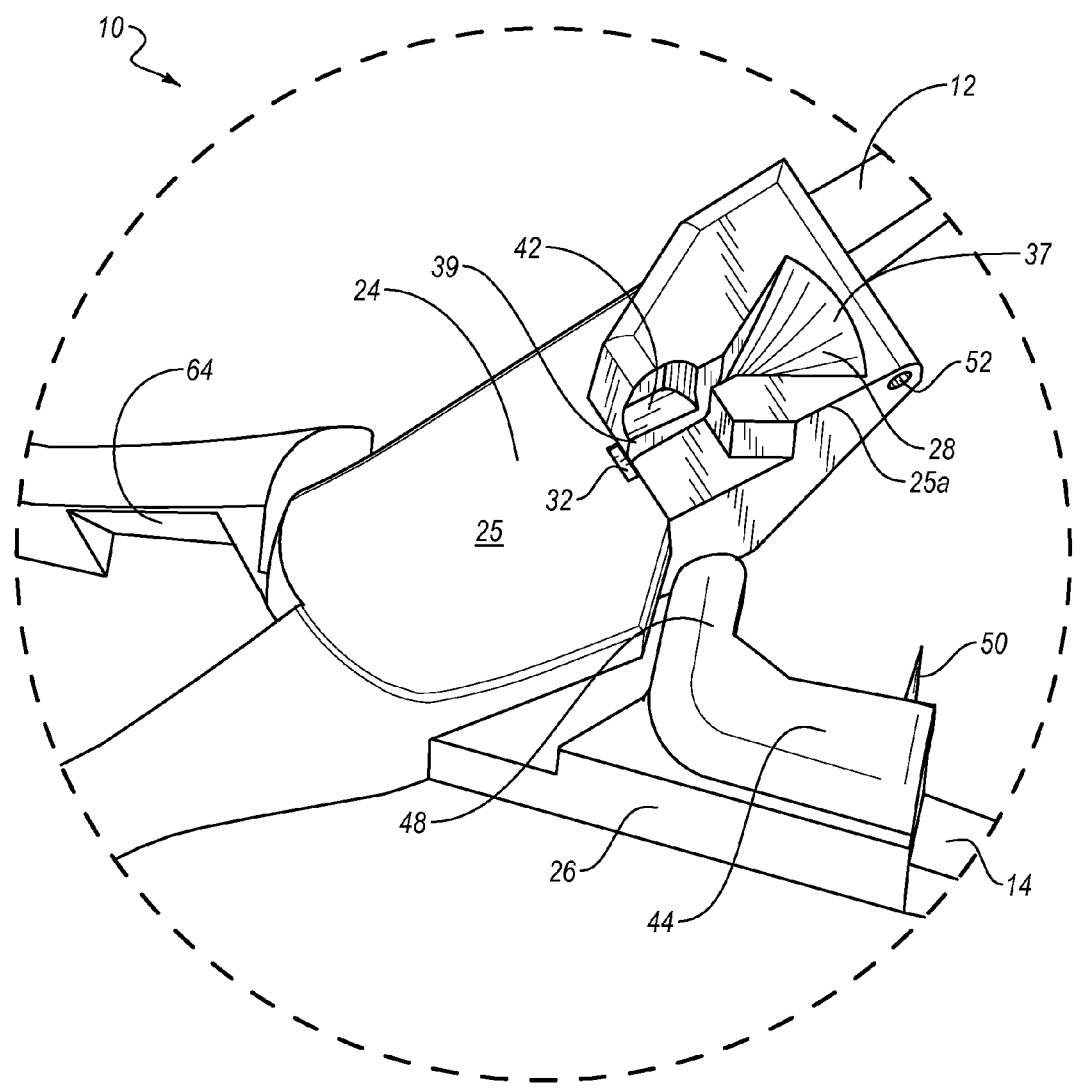
FIG. 2 illustrates an enlarged view of the circled portion of the pliers 10 of FIG. 1.
Figure 2A:
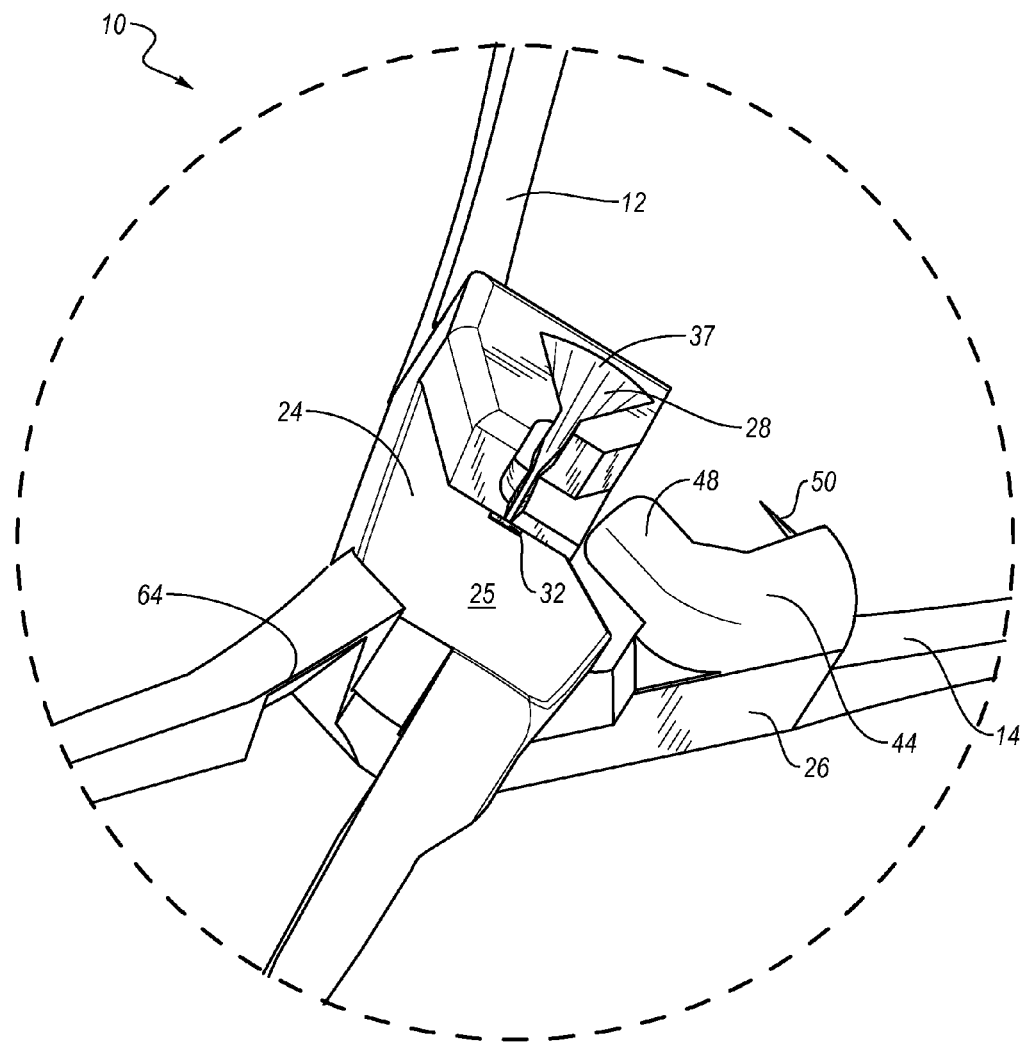
FIG. 2a shows another enlarged view of the intermediate portion of pliers 10.

FIG. 1 shows a set of fishing pliers 10, having a first elongate member 12 pivotally connected to a second elongate member 14, each member 12, 14 having a handle 16, 18 at the respective proximal portion thereof and each member having a distal tip 20, 22 at the distal portion thereof. Each member 12, 14 has a respective intermediate section 24, 26 between the proximal handle and the distal tip thereof. FIG. 2 is an enlarged view of a portion of the pliers shown in FIG. 1.

The intermediate section 24 has a distal platform 25 and a proximal raised portion 25a that is adjacent to distal platform 25 and is raised with respect to the distal platform 25. Distal platform 25 can be curved so as to receive the curling fishing line 30 that is extended thereon (see FIG. 5) when a line 30 is placed through and eyelet of a lure.

As shown in FIGS. 1 and 2, the first member 12 of pliers 10 has, in the proximal raised platform 25a thereof, a channel 28 configured to receive a fishing line 30 (see FIG. 5) therein. The distal platform 25 has a slot 32 therein that is generally transverse to the longitudinal axis of channel 28 and is configured to receive the eyelet 36 of a fishing hook 38 of a fishing lure therein.

Pliers 10 are configured to enable a user to conveniently move a fishing line 30 along channel 28 and into the eyelet 36 of a fishing hook that is mounted within slot 32, which is aligned with and adjacent to channel 28 so as to enable the eyelet 36 to conveniently receive line 30, as discussed in detail herein.

A proximal end 37 of the channel 28 is wide, so as to readily receive a fishing line 30. The distal end 39 of the channel is narrow, so as to begin feeding a line into transverse slot 32.

Adjacent channel 28 is a cavity 42 bored out of the raised portion 25a of the intermediate section 24, or otherwise formed in raised portion 25a during manufacture. Second elongate member 14 includes a raised portion 44. When pliers 10 are closed, an arm 48 of the raised portion 44 extends into the cavity 42. In use, the fishing line 30 travels through channel 28 and under arm 48 and then through eyelet 36 mounted in slot 32, which is adjacent the second channel.

Thus, in the closed position, arm 48 prevents line 30 from being inadvertently moved from channel 28. Arm 48 extends generally transverse to a longitudinal axis of second elongate member 14 and fits into cavity 42 of first elongate member 12 to maintain line 30 in channel 28 during use. In certain embodiments, line 30 can be placed in channel 28, after which arm 48 is placed in cavity 42 over line 30 by closing pliers 10. Optionally, in certain embodiments, line 30 can be placed in channel 28 after arm 42 has already been placed in cavity 48. A spike 50 extends from raised portion 44 and fits into a hole 52 in raised portion 25a when pliers 10 are closed. Spike 50 can be used for cleaning an eyelet 36, for example.

Spike 50 is an example of a protuberance that fits within a mating recess 52 in order to assist with the aligned connection of elongate member 12 to elongate member 14, assuring that the members 12, 14 are properly aligned as line is fed through the channel 28.

Figure 3:
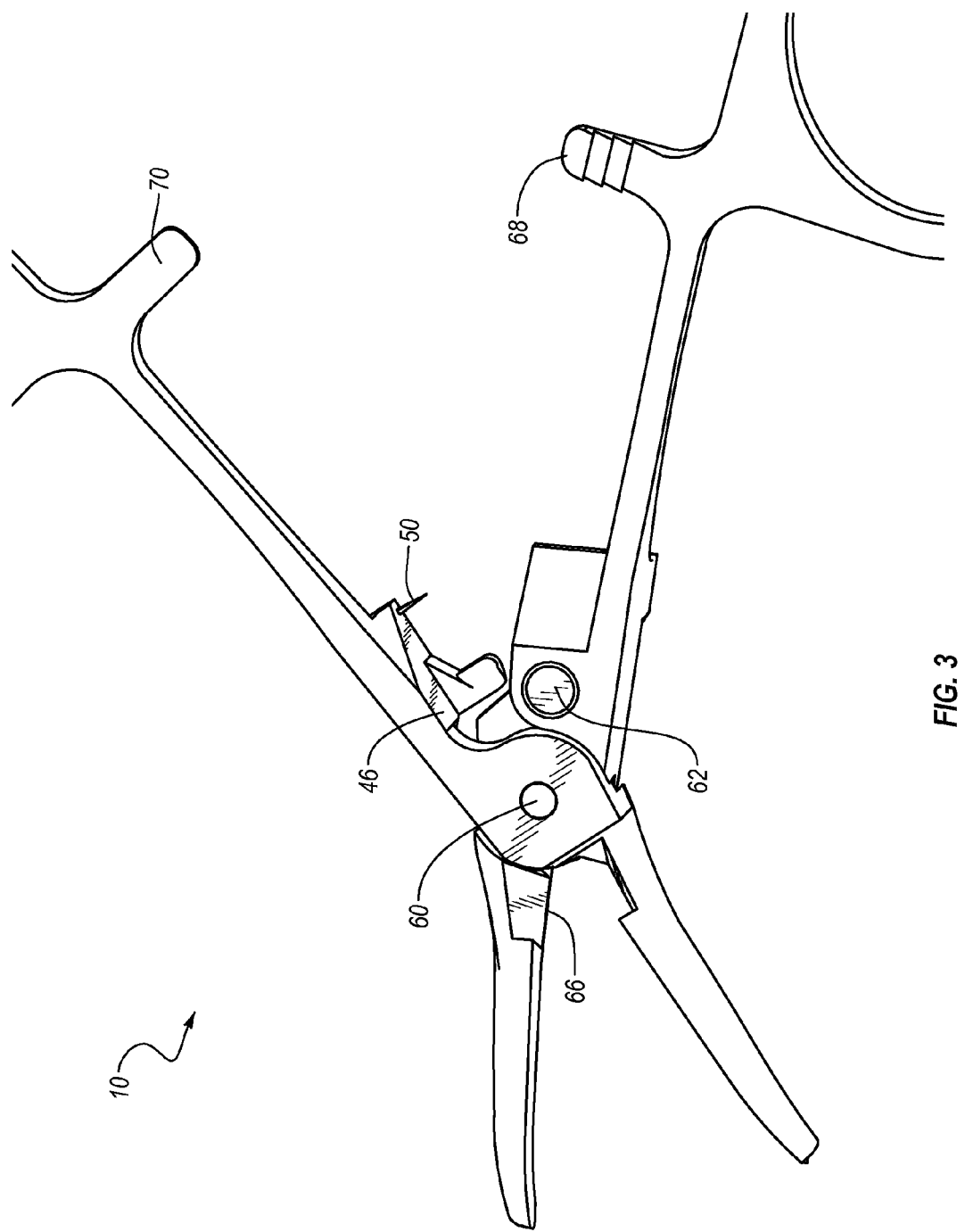
FIG. 3 illustrates a perspective bottom view of the pliers 10 of FIG. 1, showing the magnet 62 used to magnetically attach a lure to the pliers.

The bottom portion of the pliers shown in FIGS. 1 and 2 is shown in FIG. 3. FIG. 3 shows the pivot point 60 at which the first and second elongate members 12, 14 are connected and further shows a magnet 62 mounted within elongate member 12 below slot 32, the magnet 62 being capable of providing a magnetic force that temporarily maintains the metallic eyelet 36 in the slot 32 while the line 30 is threaded through the eyelet 36.

Figure 4:
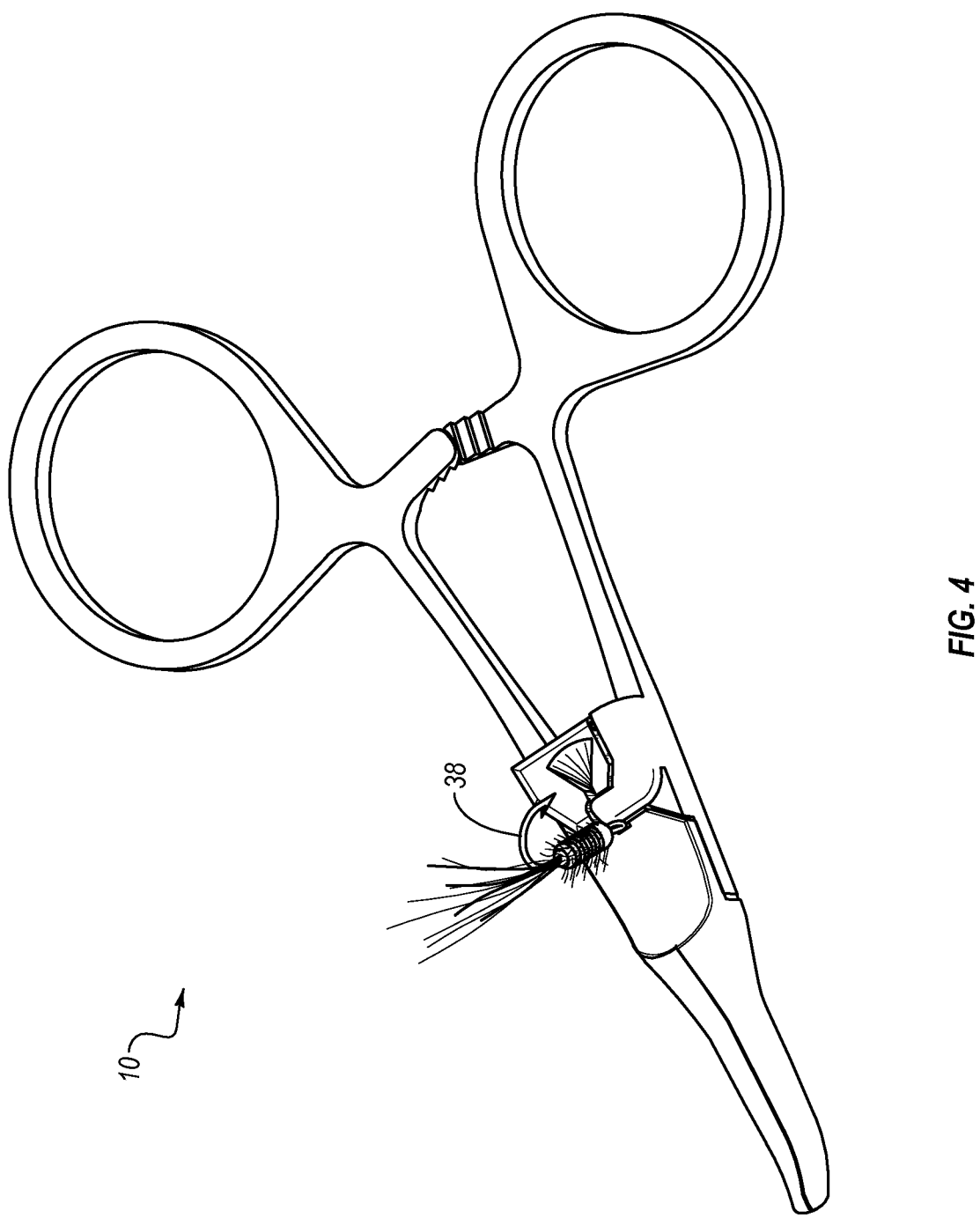
FIG. 4 illustrates a top view of the pliers 10 of FIG. 1, wherein the pliers 10 are closed and have a lure in the form of a fishing fly mounted thereon and magnetically held thereon by the force of the magnet. The metallic eyelet of the lure is mounted in a slot 32 in the pliers 10 and held in the slot by the magnet (until removed by the user), such that a fishing line 30 can be threaded along the channel in the pliers and through the eyelet.

FIG. 4 shows the pliers of FIGS. 1-3 with a fishing lure 38 in the form of a fishing fly magnetically coupled to pliers 10 by being mounted within slot 32 such that the eyelet 36 of the hook of the lure 38 is oriented so as to be capable of receiving fishing line 30 that is extended through channel 28. As shown in FIG. 4, the hole defined by the eyelet is generally transverse to the channel 28. As shown in FIG. 4, pliers 10 are closed such that arm 48 is closed over channel 28, such that line 30 will not be accidentally removed out of channel 28 when placed therein.

Figure 5:
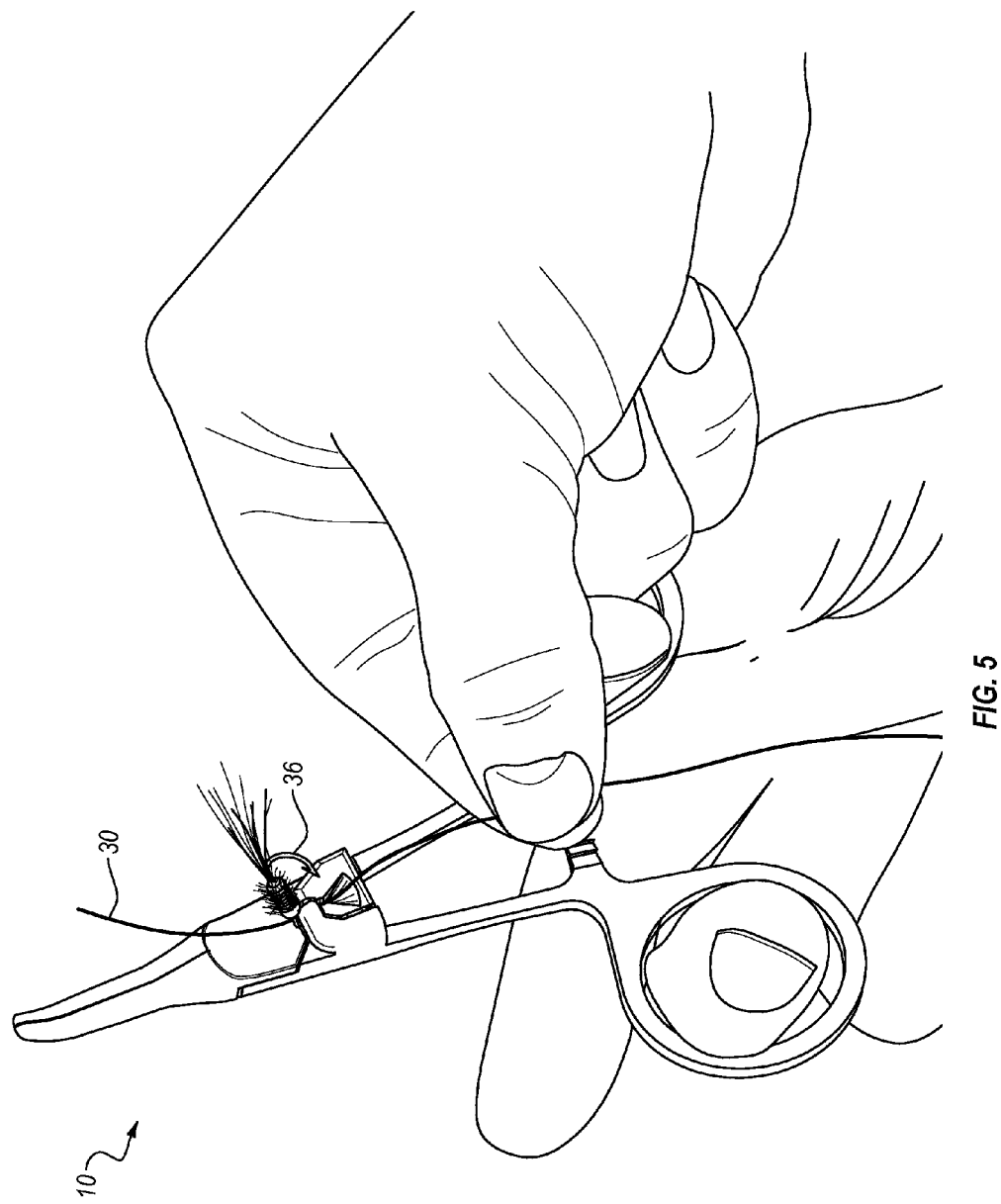
FIG. 5 illustrates the convenient threading of a fishing line along the channel 28 of the pliers 10 of FIG. 1 and through the metallic eyelet of the lure 38 held in place by the magnet of the pliers, such that the magnetic portion of the pliers conveniently holds the lure in place with the eyelet aligned with the channel while the user threads the line along the channel and through the eyelet. The line, extended through the eyelet, is then removed from the pliers.

FIG. 5 shows a user threading line 30 along channel 28 of the pliers 10 and through eyelet 36 of the hook of lure 38 that is mounted within slot 32 of first elongate member 12. Once pliers 10 are closed, line 30 can be fed through channel 28 and through the eyelet 32 without being accidentally moved out of channel 28.

With reference now to FIGS. 6-12, once the line 30 is extended through the eyelet 36 of the hook 38, the pliers can be used to form the desired fishing knot that connects lure 38 to line 30.

Figure 6:
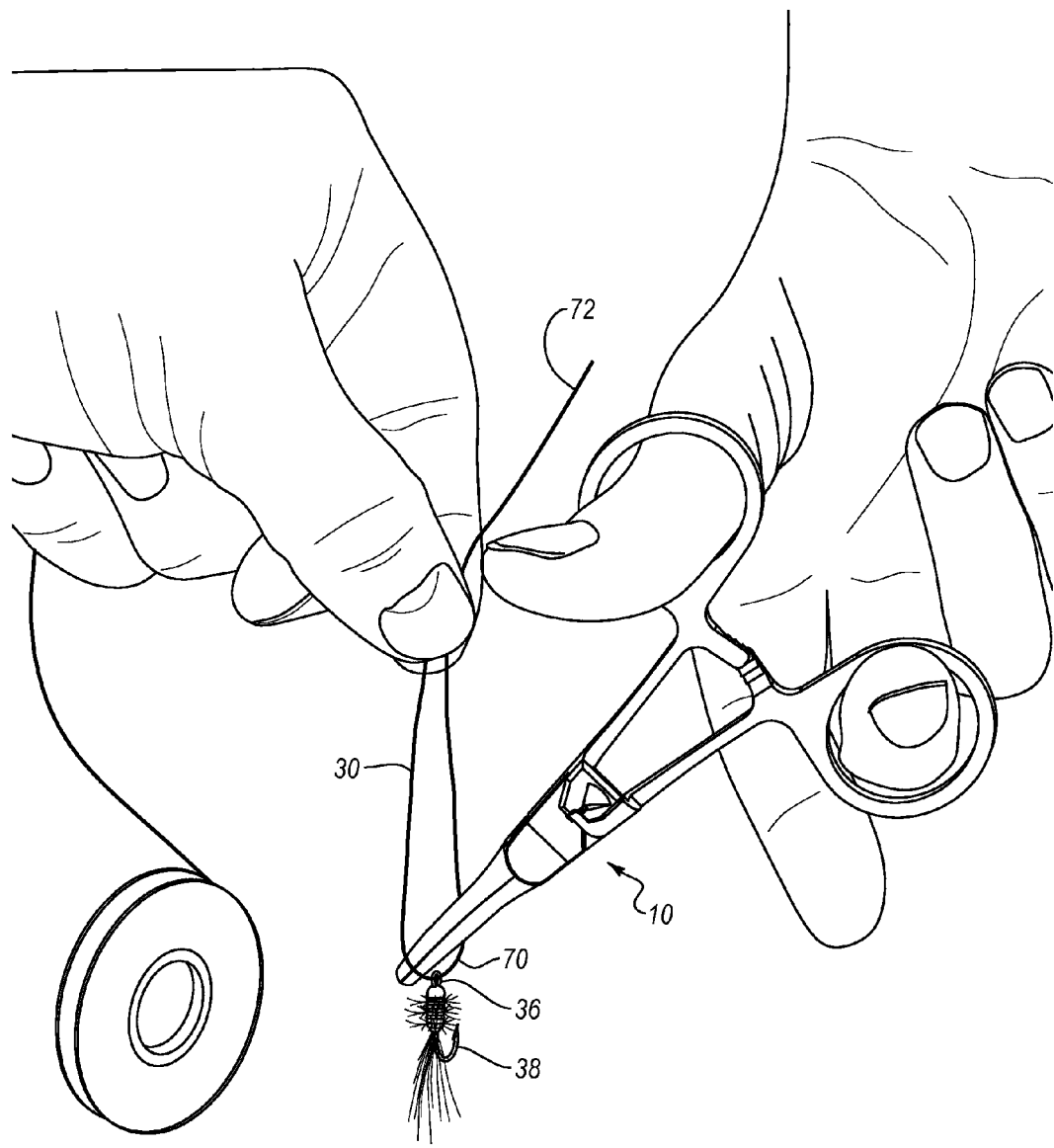
FIGS. 6-11 illustrate the process of tying a fishing knot using the threaded line of FIG. 5 using the pliers of FIG. 1
Figure 7:
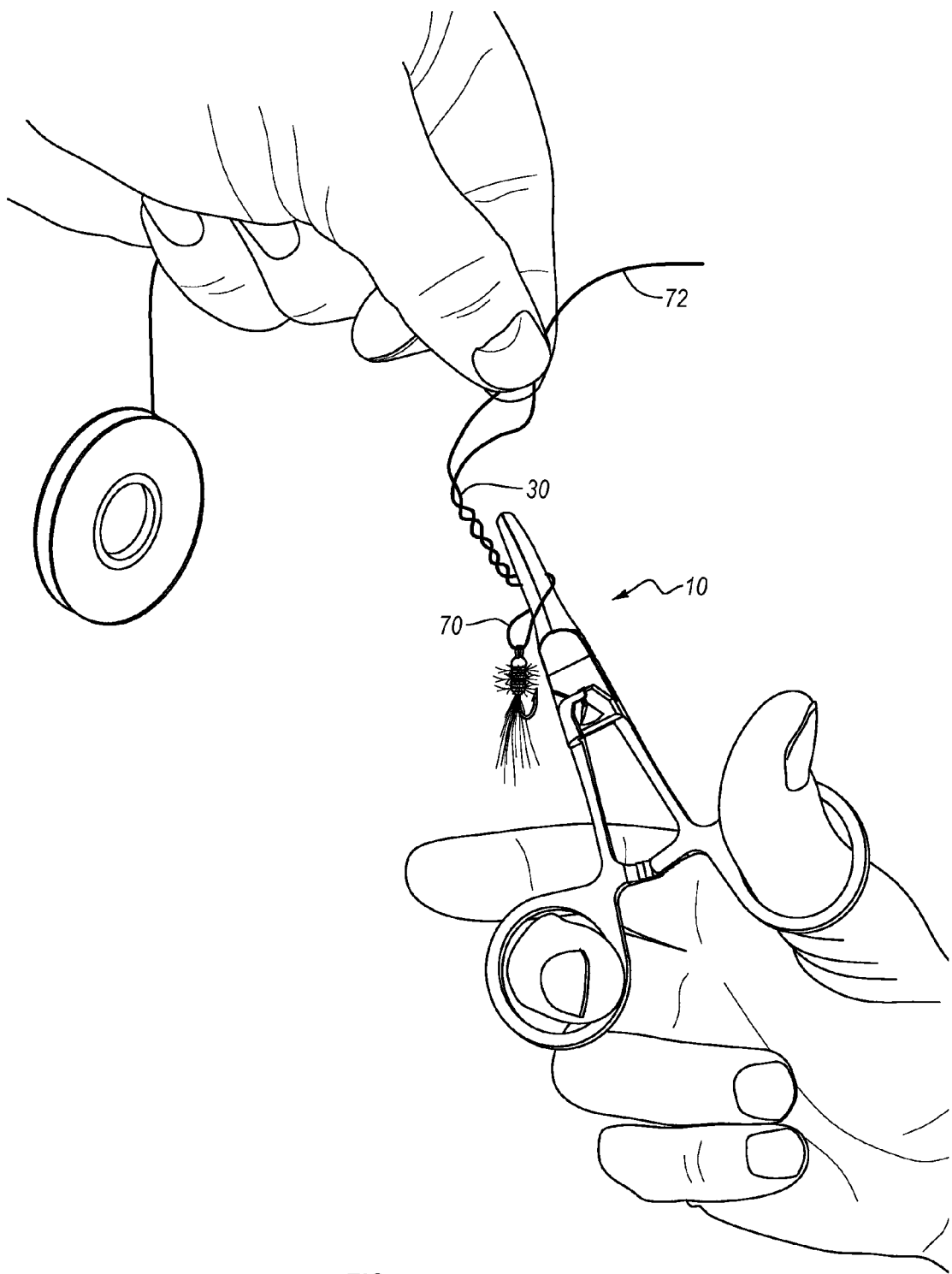
Figure 8:
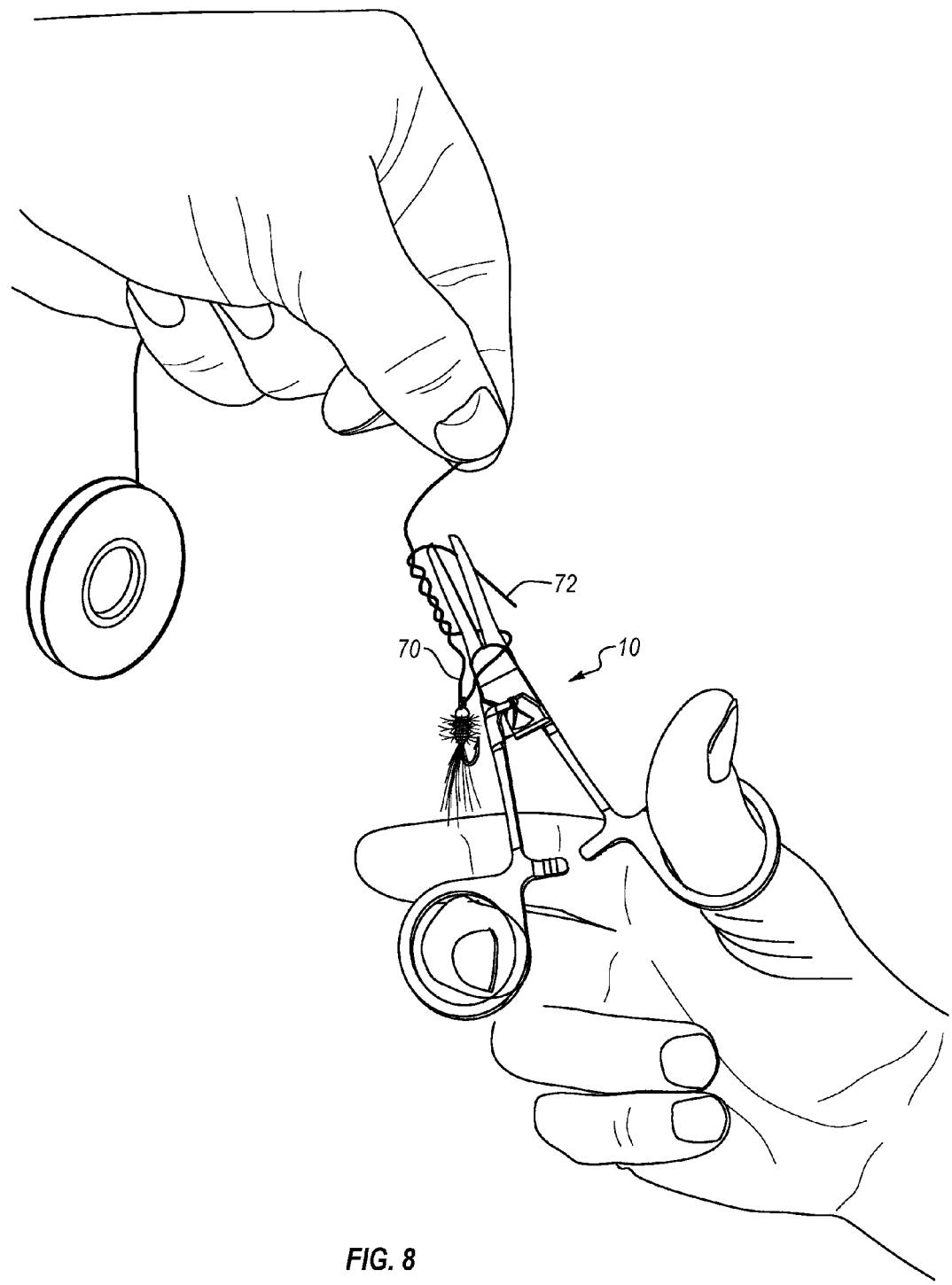
Figure 9:
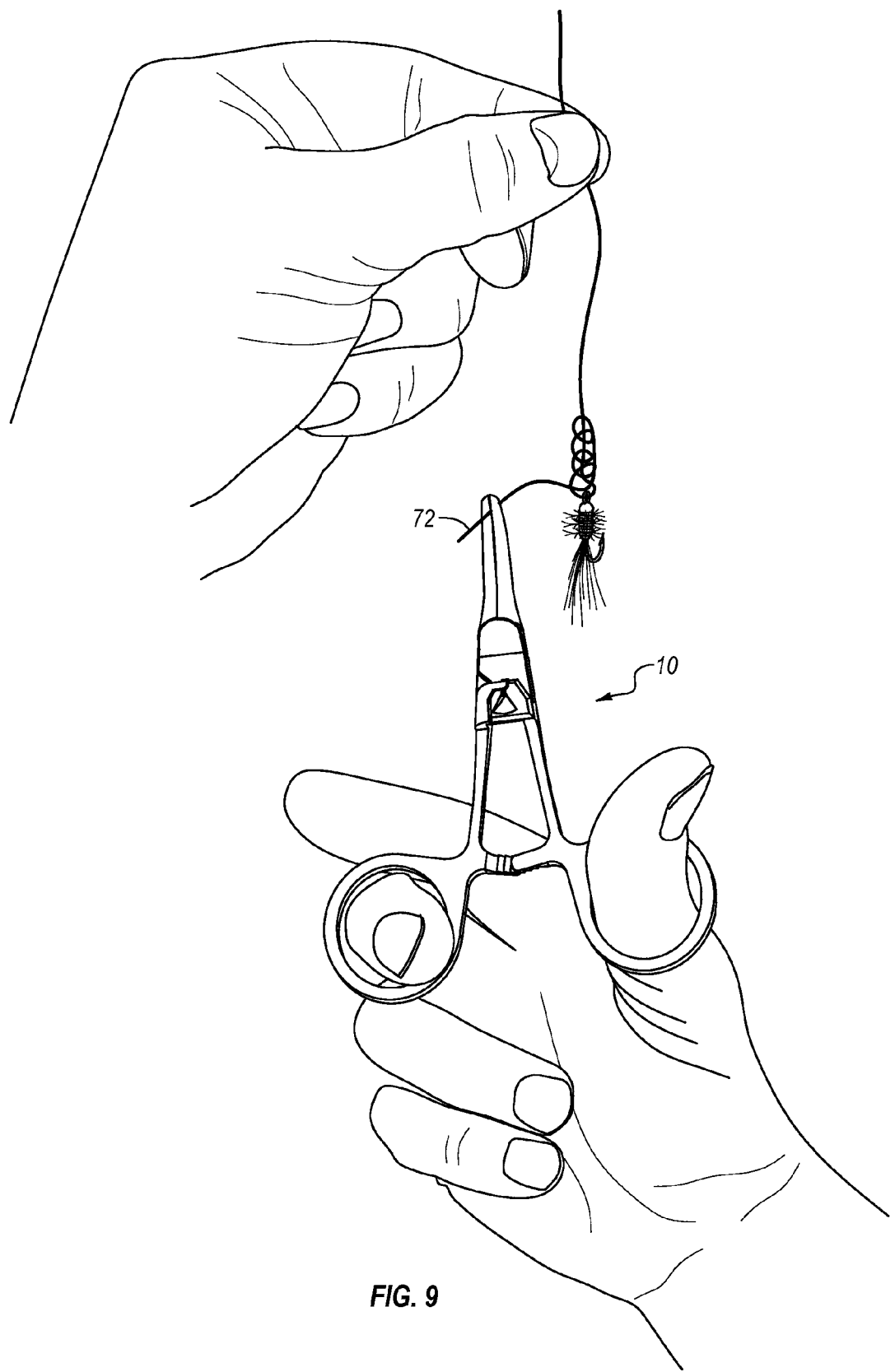
Figure 10:
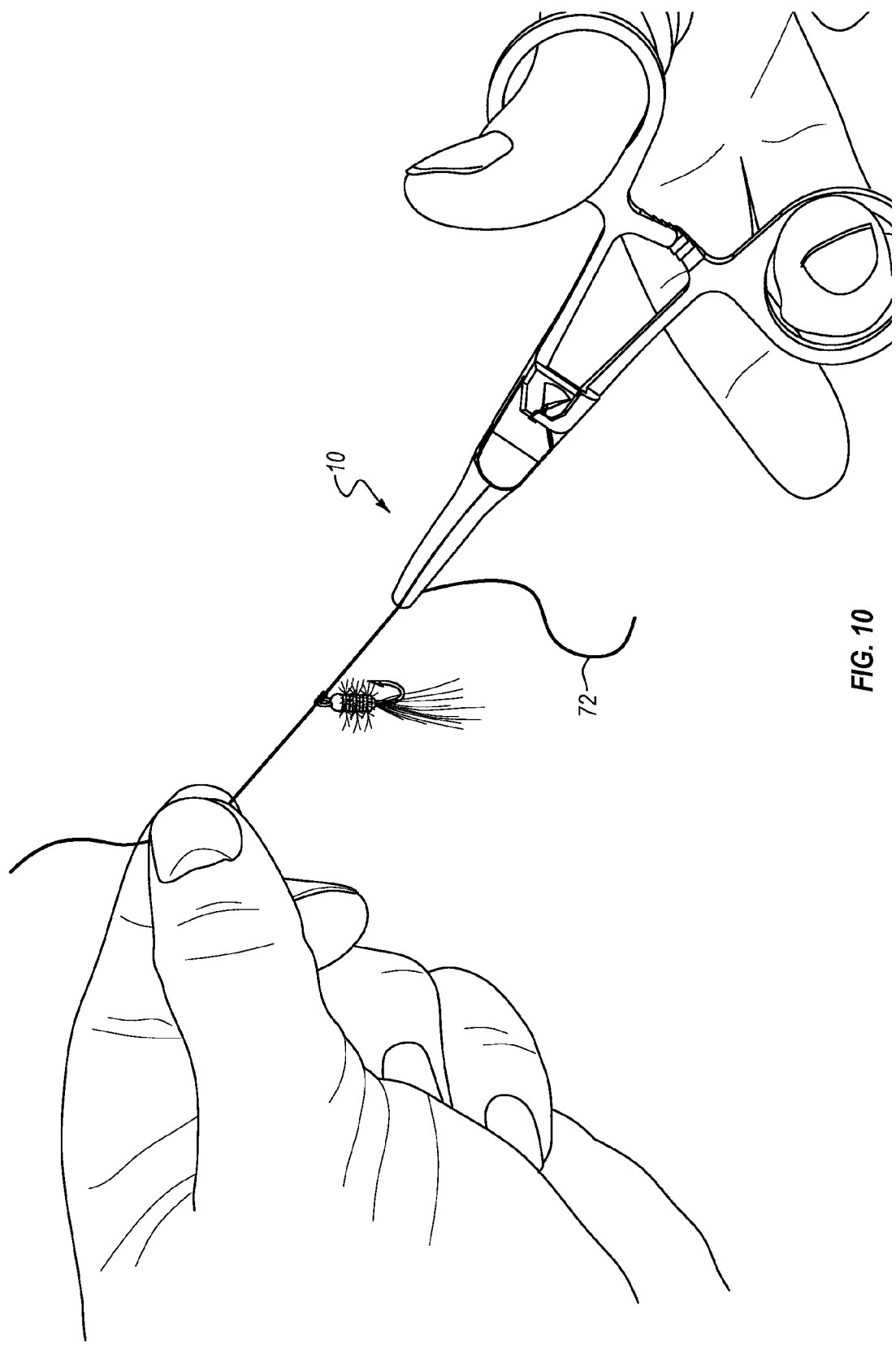
Figure 11:
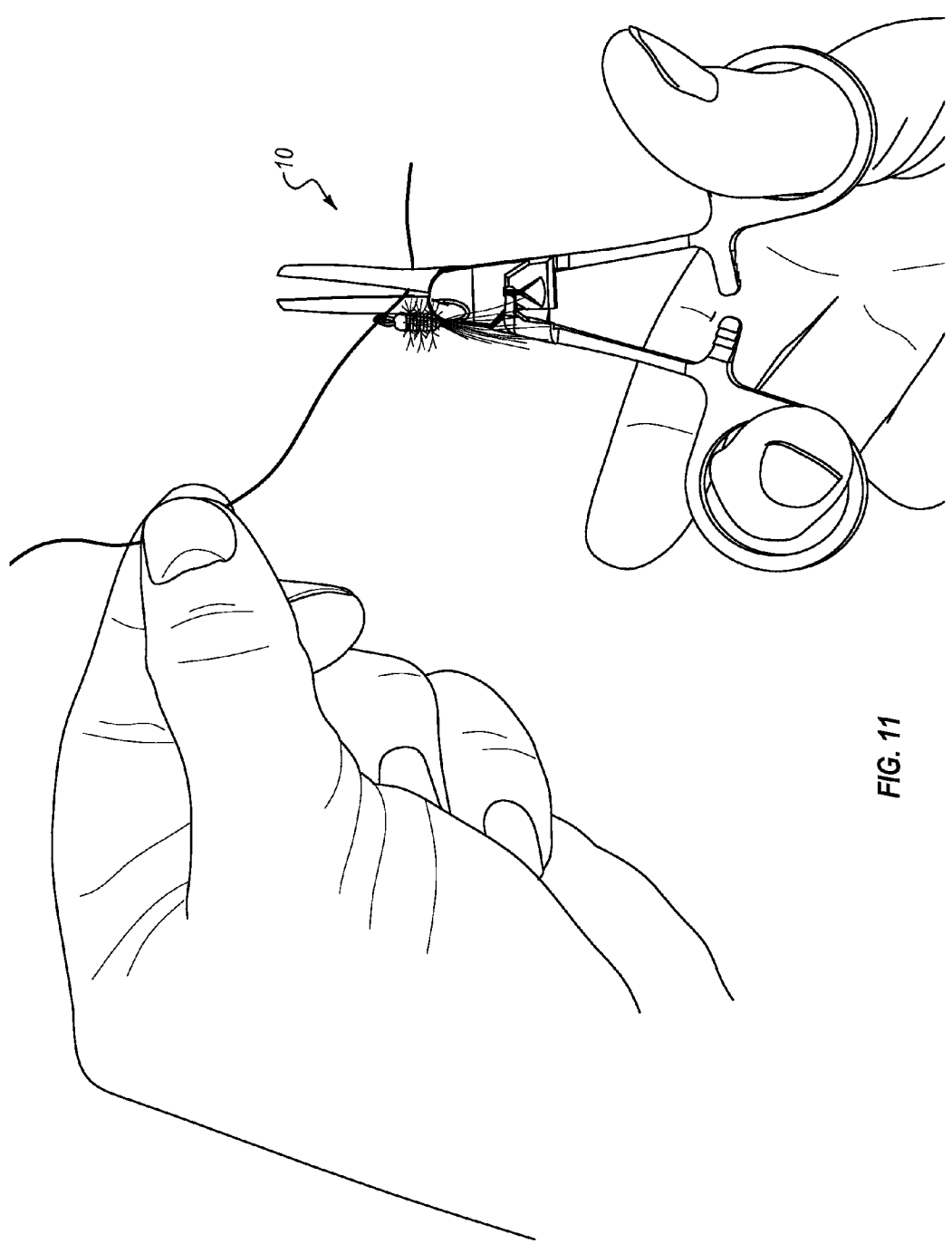

FIG. 6 illustrates placing pliers 10 within the loop 70 of line 30. FIG. 7 illustrates the use of pliers 10 of FIG. 1 to twist line 30 in order to begin tying a standard fishing knot. FIGS. 8-9 illustrate grasping a free end of the twisted line 30 with the distal tip of pliers 10 and pulling the free end 72 of the line 30 through the bottom loop 70 of the line 30. FIG. 10 illustrates tightening the line to form a desired knot in the line. FIG. 11 illustrates cutting the excess line from the knot using cutting blades 64, 66 of pliers 10.

Thus the fishing pliers 10 of the present invention are comprised of first and second members 12, 14 pivotally coupled to each other, each member 12, 14 having handles 16, 18 at proximal ends thereof respectively and distal tip ends 20, 22 at distal ends thereof respectively. The distal tip ends 20, 22 have respective cutting blades 66, 64 at proximal portions thereof, the first elongate member 12 having a channel 28 in the intermediate portion thereof and a slot 32, channel 28 receiving a fishing line 30 when an eyelet 36 of a fishing hook 38 is mounted within the slot 32, and the second elongate member having an arm 48 that fits within a cavity 42 of the first member to close channel 28 such that line 30 is not inadvertently removed from channel 28 during attachment. The fishing pliers 10 are very versatile and can accomplish a number of different tasks required by the fisherman to connect a fishing hook or fly or other lure to a fishing line, which is often a cumbersome and time consuming process, which becomes more difficult with age or disability. Pliers 10 are used to initially thread the line 30 onto the hook 38, and then to form a knot in the line and cut away excess line from the knot once the hook is threaded.

Magnet 62 is positioned in elongate member 12 adjacent slot 32 such that the magnetic force of magnet retains the eyelet 30 of the hook therein such that line 30 can be readily passed through the eyelet 30. Elongate members 12, 14 may comprise a material such as plastic or stainless steel that do not interfere with the magnetic force. In one embodiment, proximal raised portion 25a is manufactured as a separate snap in piece for convenient manufacturing and/or for enabling the changing of the size of the chamber 28 for receiving different line diameters, etc.

With reference again to FIG. 1, the distal tips 20, 22 of the respective elongate members of the pliers of the present invention are substantially straight along the surfaces of the respective bodies thereof and have a slight bend at the distal tip end 20a, 22a thereof. However, in other embodiments, the slight bend at the tip end is not required.

The bodies of distal tips 20, 22 are substantially straight with little or no tapering angle along the surfaces of the bodies thereof (and do not substantially bend until reaching the tip ends 20a, 22a) in order to improve the ability to twist fishing line 30 without fishing line 30 falling off the distal tips 20, 22, as shown in FIG. 7. The straight or substantially straight tips, e.g., tips 20, 22 make twisting the line 30 during a knot tying procedure, as shown in FIG. 7 more convenient because the line 30 is less likely to fall off the pliers, as opposed to dramatically tapering tips. Dramatically tapering tips have a surface angle that causes line to fall off during the twisting procedure. However, the straight or substantially straight tips 20, 22 make twisting the line 30 during a knot tying procedure, as shown in FIG. 7 more convenient because the line is less likely to fall off.

Figure 12A:
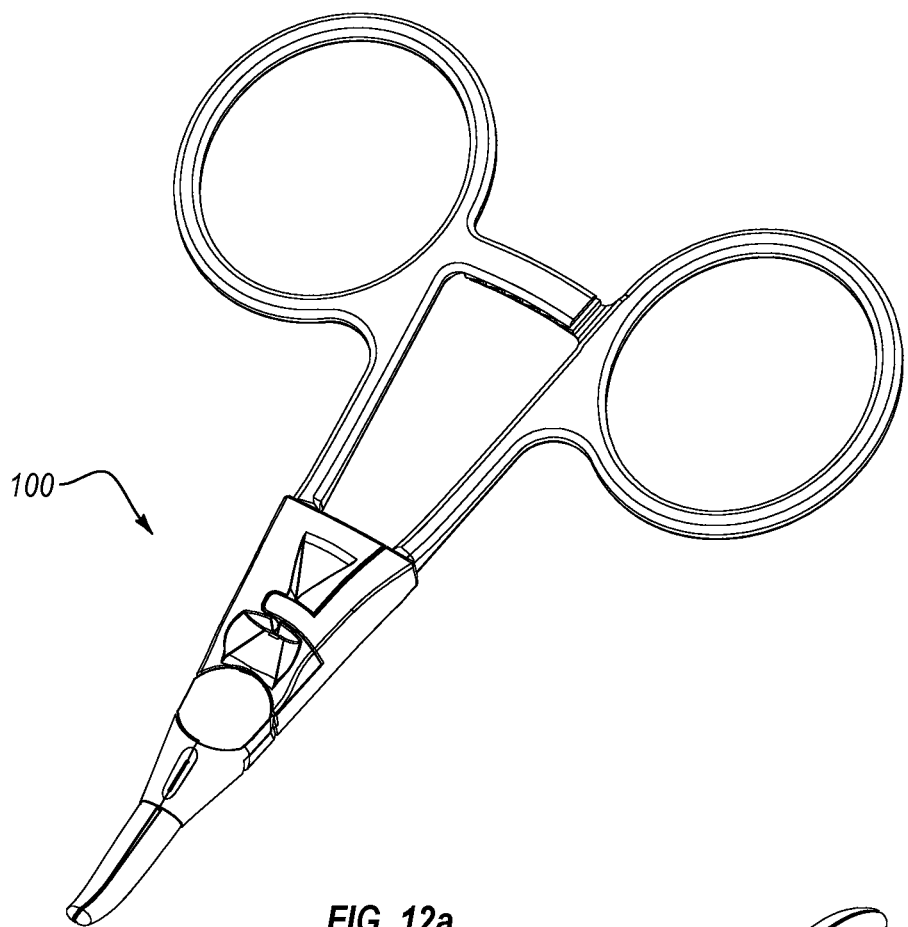
Figure 12B:
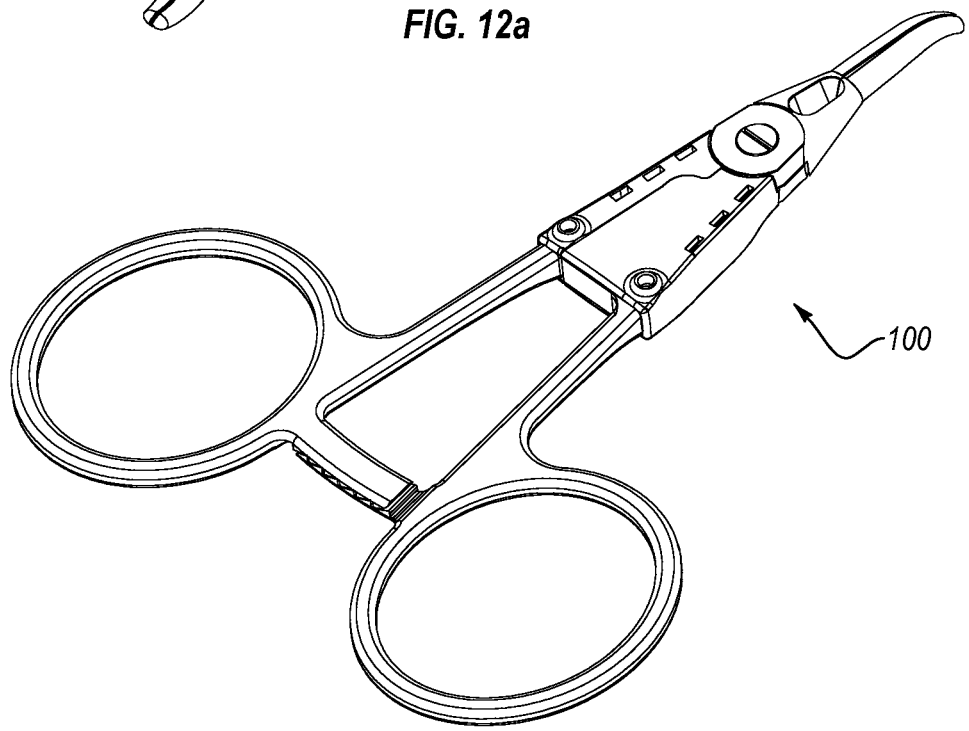
Figure 13A:
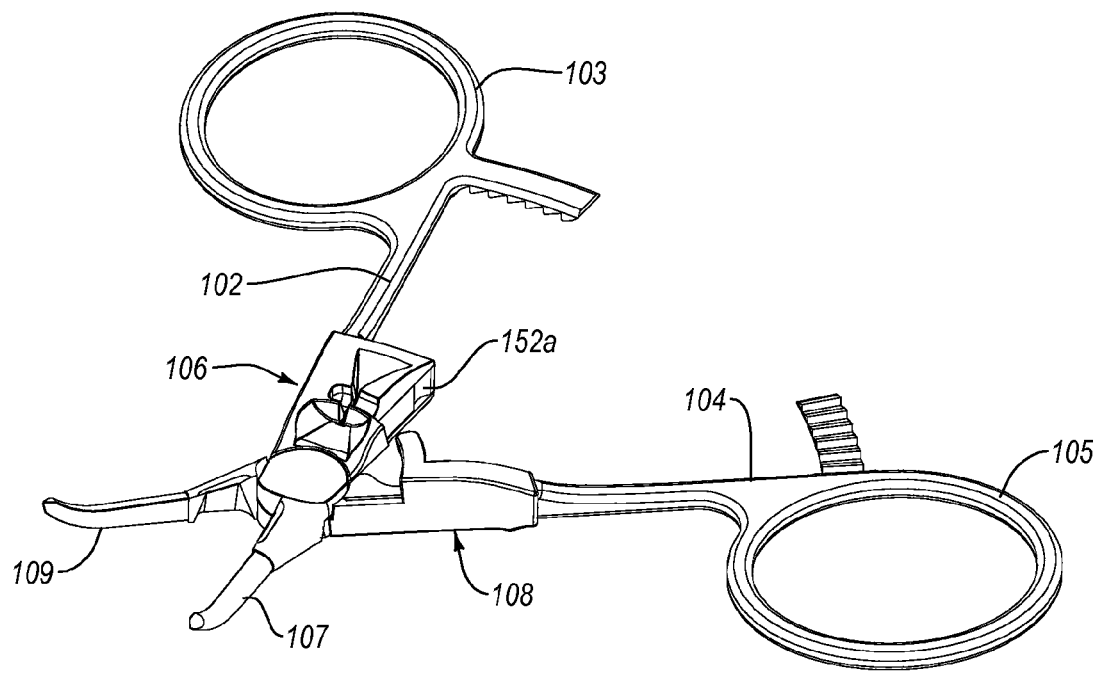
FIGS. 13a and 13b show pliers 100 in open top and bottom perspective views.
Figure 13B:
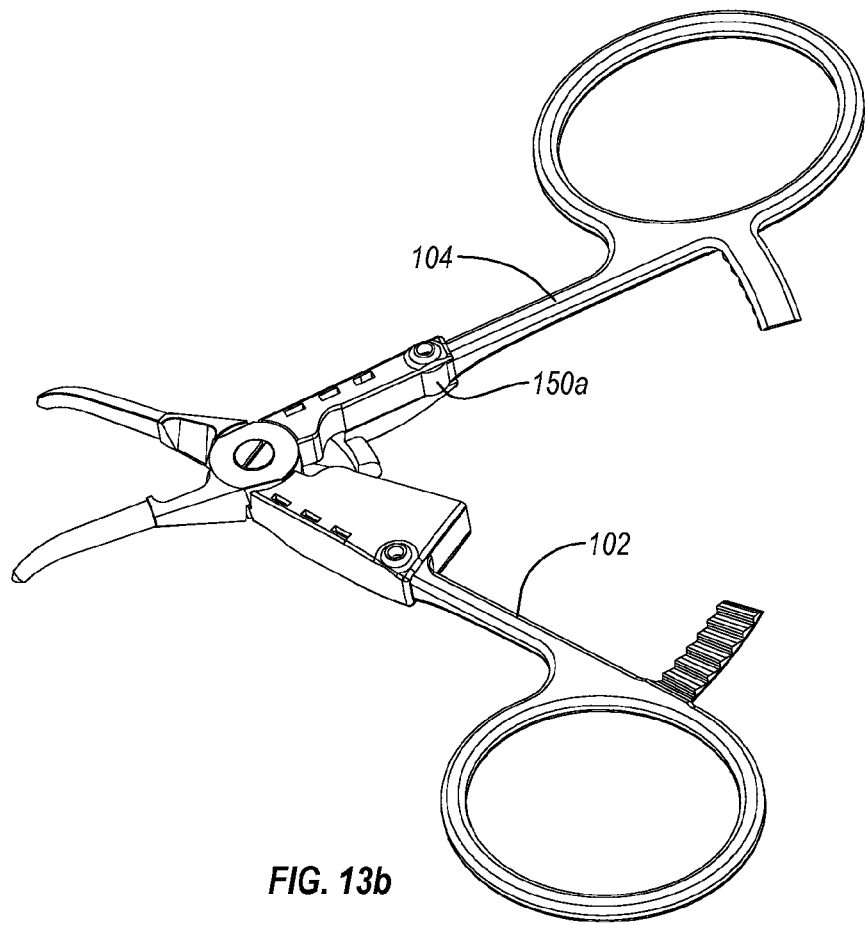
Figure 14B:
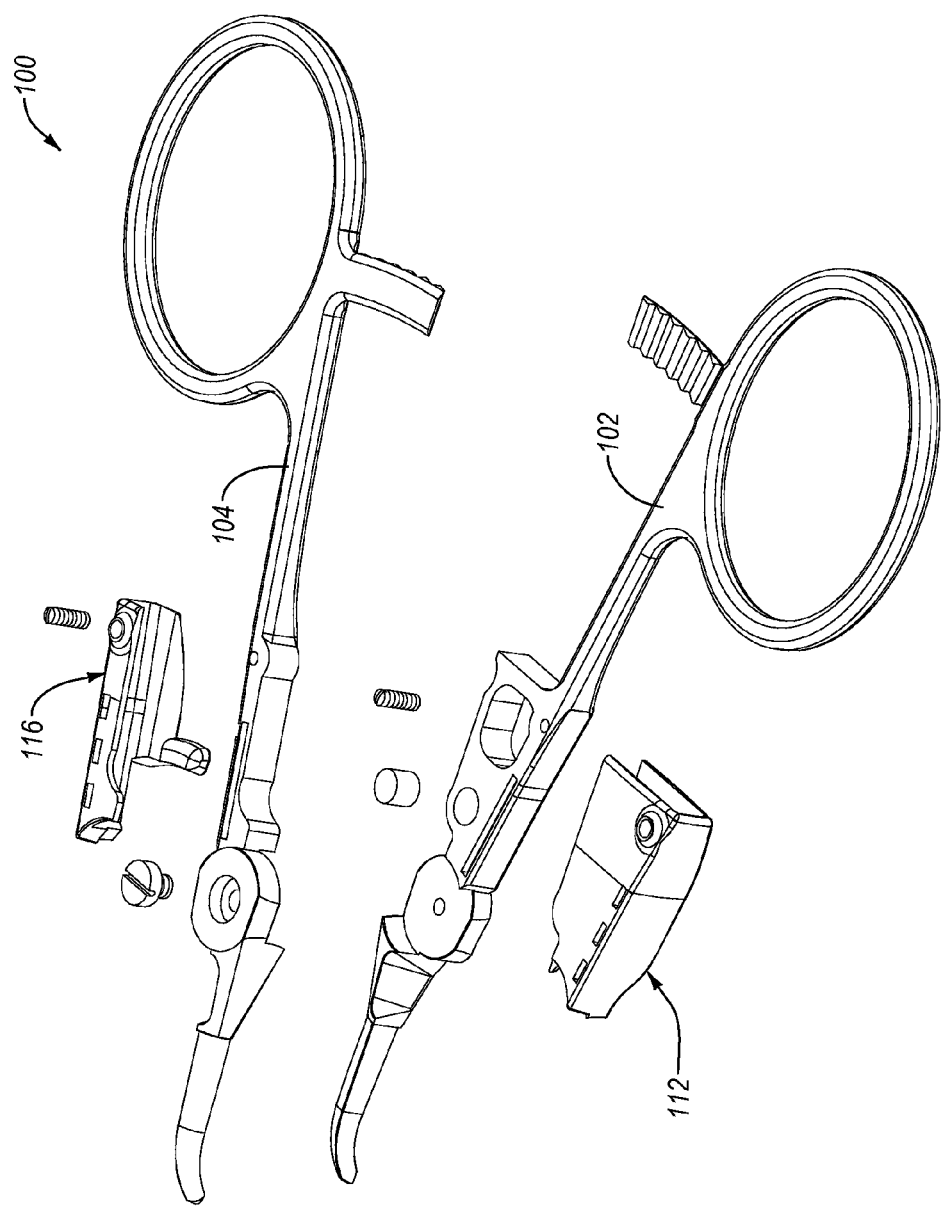
Figure 15:
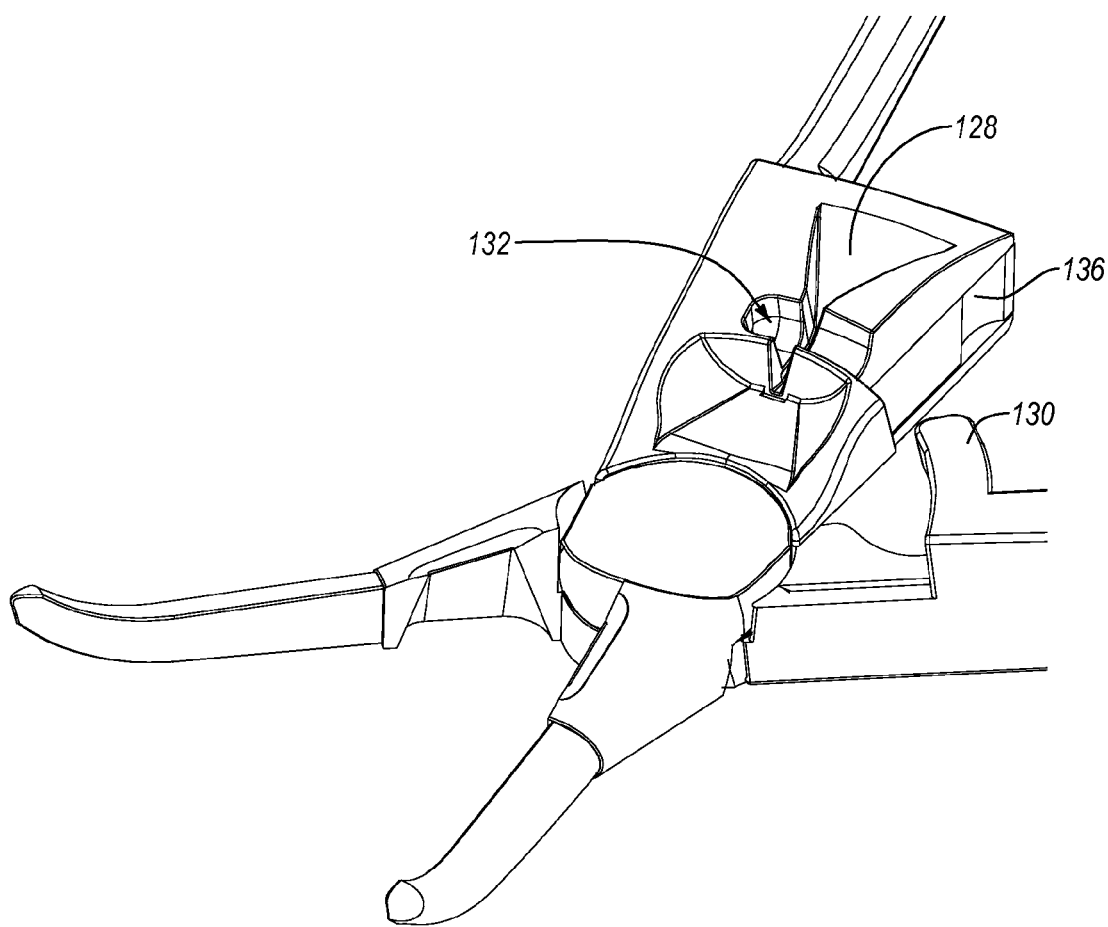

FIGS. 12a-15 show another embodiment of pliers 100 of the present invention, FIGS. 12a and 12b showing respective top and bottom perspective views in a closed position and FIGS. 13a and 13b showing respective top and bottom views of pliers 100 in a open position. Pliers 100 are similar to pliers 10, and, as shown in FIGS. 14a-b and 15, and are assembled through the use of attachable platform assembly and arm assembly components in the intermediate sections thereof.

Pliers 100 comprise a first elongate member 102 and a second elongate member 104, each having a handle 103, 105 at the respective proximal portion thereof and a distal tip 107, 109 at the distal portion thereof, and each having a respective intermediate section 106, 108 between the proximal handle and distal tip thereof.

With reference to FIGS. 13a, 14a-b and FIG. 15, the intermediate section 106 of elongate member 102 comprises: (i) a frame portion 110 between the proximal handle and the distal tip; and (ii) an attachable platform assembly 112 that is slidably mounted onto the frame portion 110 during assembly and attached thereto with screw 120a. Platform assembly 112 comprises (A) a proximal raised portion 113a containing the channel 128 for feeding fishing line into an eyelet of a fishing lure; and (B) a lower attachment panel 113b coupled thereto, forming U-shaped slidably mounting assembly 112.

Intermediate section 108 of elongate member 104 comprises: (i) a frame portion 114 between the proximal handle and the distal tip and (ii) an attachable arm assembly 116 that is mounted onto the frame portion 114 during assembly and attached thereto with screw 120b. Screw 118 rotatably couples first elongate member 102 to second elongate member 104. Magnet 122 mounts into aperture 122a of intermediate section 110 between portions 113a and 113b of assembly 112. Magnet may be retained in position between portions of assembly 112 and/or through the use of an adhesive or press fitting relationship within frame 110, for example.

In one embodiment platform assembly 112 and arm assembly 116 are attachable and detachable from respective frame portions 110, 114, and are thus modular pieces which can be exchanged for assemblies having different sized components.

Platform assembly 112 has channel 128 therein for feeding fishing line into an eyelet of a lure. A slot for holding an eyelet adjacent magnet 122 is transverse to channel 128. Channel 128 of assembly 112 may be the same as or similar to channel 28 of pliers 10, for example, such that pliers 10 can function similarly to pliers 110.

In one embodiment platform assembly 112 and arm assembly 116 are attachable and detachable from respective frame portions 110, 114, and are thus modular pieces which can be exchanged for assemblies having different sized components. Thus, different types and sizes of assembly 112 and assembly 116, having different sized channel 128 and arm 130, respectively, for different sized fishing line, for example, can be used on respective elongate members 102, 104. Since such pieces can be modular, one size of assembly 112 and/or assembly 116 may be substituted for another into order to feed different sized line through different sized eyelets using the same first and second members 102, 104.

In addition, manufacture of separate, attachable platform assembly 112 and arm assembly 116 enables pliers 100 to weigh less, be easily machined, and be used with different sized eyelets and fishing lines, depending upon the sizes of the channels in the platform assembly 112. Assembly 112 and/or assembly 116 may be made of plastic, for example, while the first and second members 102, 104 may be made of a metallic material, for example, such as stainless steel, enabling the detailed portions of assembly 112 and assembly 116 to be very accurately and inexpensively produced.

Arm 130 of arm assembly 116 fits within cavity 132 when elongate members 102, 104 are in a closed position, thereby assisting with proper alignment, retaining the line within the channel 128 of assembly 112 and providing a guide against which the lure can be placed.

Tab 150a fits within a mating recess in the form of groove 152a. Tab 150a is another example of a protuberance that fits within a mating recess in order to assist with the aligned connection of elongate member 102 to elongate member 104, assuring that the members 102, 104 are properly aligned as line is fed through the channel of assembly 112.

Pliers 10 and 100 can each be assembled and manufactured in a variety of different manners to achieve the goals and objectives of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. Fishing pliers that enable a user to conveniently extend fishing line into an eyelet of a fishing lure, the fishing pliers comprising:

a first elongate member, and a second elongate member pivotally coupled to the first elongate member, each elongate member having a proximal handle portion and a distal tip end portion and an intermediate section therebetween, the first and second elongate members being pivotally coupled at respective intermediate sections thereof, wherein the first elongate member has, in the intermediate section thereof, a channel configured to receive fishing line and a slot configured to receive an eyelet of a fishing lure such that when fishing line is passed through the channel the fishing line is oriented so as to be configured to conveniently enter the eyelet of the fishing lure, thereby enabling the user to conveniently extend fishing line into the eyelet of a fishing lure, wherein the second elongate member has, in the intermediate section thereof, an arm that fits within a cavity of the first elongate member intermediate section when the two elongate members are in a closed position and which covers the channel so as to prevent line from being inadvertently removed from the channel.

2. Fishing pliers as recited in claim 1, further comprising a magnet adjacent to the slot, the magnet generating a force that selectively maintains the eyelet of the lure in a desired location adjacent to the channel with the eyelet ready to receive the fishing line therethrough.

3. Fishing pliers as recited in claim 1, further comprising a platform that receives the line thereon after the line passes through the eyelet.

4. Fishing pliers as recited in claim 3, wherein the platform is curved so as to receive a curling fishing line.

5. Fishing pliers as recited in claim 1, wherein a longitudinal axis of the slot is transverse to a longitudinal axis of the channel.

6. Fishing pliers as recited in claim 1, wherein the channel in the intermediate section of the first elongate member has a fan shape beginning in a wider portion than the terminal end thereof.

7. Fishing pliers comprising a first elongate member, pivotally coupled to a second elongate member, each elongate member having a proximal handle portion and a distal tip end portion and an intermediate section there between;
    wherein the first elongate member has in the intermediate section thereof a channel configured to receive fishing line and a slot configured to receive an eyelet of a fishing lure such that when fishing line is passed through the channel, it enters the eyelet of the fishing lure, thereby enabling the user to conveniently extend fishing line into the eyelet of a fishing lure; and
    wherein, the second elongate member has in the intermediate section thereof, an arm that fits within a cavity of the first elongate member intermediate section when the two elongate members are in a closed position and which covers the channel so as to prevent line from being inadvertently removed from the channel.

8. Fishing pliers as recited in claim 7 wherein each of the distal ends of the elongate members has a corresponding cutting portion, configured to cut away excess fishing line.

9. Fishing pliers as recited in claim 7 further comprising an aperture in the intermediate section of the first elongate member and a spike connected to the intermediate section of the second elongate member to be used for cleaning the eyelet of a fishing hook when desired.

10. Fishing pliers as recited in claim 7 wherein the distal ends of the pliers are designed within an appropriate thickness to enable the fishing line to be wound about the distal ends of the elongate members without slipping off the elongate members.

11. Fishing pliers as recited in claim 7 wherein the channel in the intermediate section of the first elongate member has a fan shape beginning in a wider portion than the terminal end thereof.

12. Fishing pliers as recited in claim 7, further comprising a magnet adjacent to the slot, the magnet generating a force that selectively maintains the eyelet of the lure in a desired location adjacent to the channel with the eyelet ready to receive the fishing line therethrough.

13. Fishing pliers as recited in claim 7, further comprising a platform that receives the line thereon after the line passes through the eyelet.

14. Fishing pliers as recited in claim 13, wherein the platform is curved so as to receive a curling fishing line.

15. Fishing pliers that enable the user to conveniently extend fishing line into the eyelet of a fishing lure, the fishing pliers comprising:
    a first elongate member, and
    a second elongate member pivotally coupled to the first elongate member, each elongate member having a proximal handle portion and a distal tip end portion and an intermediate section therebetween, wherein the pliers have, in the intermediate section thereof, a channel configured to receive fishing line and a slot that is transverse to the channel and is configured to receive an eyelet of a fishing lure such that when fishing line is passed through the channel the fishing line is oriented so as to be configured to conveniently enter the eyelet of the fishing lure, thereby enabling the user to conveniently extend fishing line into the eyelet of a fishing lure, wherein the second elongate member has, in the intermediate section thereof, an arm that fits within a cavity of the first elongate member intermediate section when the two elongate members are in a closed position and which covers the channel so as to prevent line from being inadvertently removed from the channel.

16. Fishing pliers as recited in claim 15, further comprising a magnet adjacent to the slot, the magnet generating a force that selectively maintains the eyelet of the lure in a desired location adjacent to the channel with the eyelet ready to receive the fishing line therethrough.

17. Fishing pliers as recited in claim 15, further comprising a platform that receives the line thereon after the line passes through the eyelet.

18. Fishing pliers as recited in claim 17, wherein the platform is curved so as to receive a curling fishing line.

19. Pliers as recited in claim 15 further comprising a recess in the intermediate section of the first elongate member and a protuberance connected to the intermediate section of the second elongate member.

20. Pliers as recited in claim 15 wherein the channel in the intermediate section of the first elongate member has a fan shape beginning in a wider position than the terminal end thereof.

* * * * *